United States Patent [19]
Miller et al.

[11] Patent Number: 4,857,352
[45] Date of Patent: Aug. 15, 1989

[54] LOW CALORIE ICE POP

[75] Inventors: William B. Miller; Jit F. Ang, both of Berlin, N.H.

[73] Assignee: James River Corporation, Richmond, Va.

[21] Appl. No.: 62,517

[22] Filed: Jun. 16, 1987

[51] Int. Cl.$^4$ ................................................ A23L 1/04
[52] U.S. Cl. ................................... 426/548; 426/660; 426/804; 426/573
[58] Field of Search ............... 426/565, 566, 567, 804, 426/548, 573, 249

[56] References Cited

U.S. PATENT DOCUMENTS

| | | | |
|---|---|---|---|
| 3,928,649 | 12/1975 | Cobb | 426/565 |
| 3,993,793 | 11/1976 | Finney | 426/565 |
| 4,140,807 | 2/1979 | Braverman | 426/660 |
| 4,216,242 | 8/1980 | Braverman | 426/578 |
| 4,264,637 | 4/1981 | Braverman | 426/565 |
| 4,452,824 | 6/1984 | Cole et al. | 426/565 |
| 4,626,441 | 12/1986 | Walkstein | 426/565 |
| 4,631,196 | 12/1986 | Zeller | 426/567 |
| 4,714,620 | 12/1987 | Bunick | 426/804 |

*Primary Examiner*—Jeanette Hunter
*Attorney, Agent, or Firm*—Finnegan, Henderson, Farabow, Garrett & Dunner

[57] ABSTRACT

A low calorie ice pop formulation containing powdered cellulose having an average particle size of less than about 20 microns.

20 Claims, No Drawings

LOW CALORIE ICE POP

BACKGROUND

The present invention relates to ice pops. In particular, the present invention relates to a new formulation for a low calorie ice pop.

Ice pops have been around for a long time. The smooth texture of an ice pop is attributed to the high solids content of the product. Most of the solids in these pops is from added sugar, which can range from 15 to over 20 percent of the product.

Recently there has been a lot of activity in the frozen novelty business with the addition of "fruit and juice" bars in the marketplace. To produce good quality "fruit and juice" bars, it is also important to control the solids content, particularly the solids-to-liquids ratio. Fruit bar formulations rely on fruit pulp, natural fruit sugars, and added sugar to supply the solids. The liquid fraction is derived from fruit juices adjusted with added water.

Low calorie or "lite" food products have also gained in the popularity over the last few years. Thus, there have been attempts to create "lite" ice pops. However, to lower the calories of the pops requires the removal or replacement of most of the solid material in the pop, i.e., sugar, fruit pulp, etc. Lowering the solid content results in hard and less smooth ice pops.

One attempt to make a type of "lite" ice pop was with a product known as "Aspen Lite." This product was sweetened with saccharin and texturized with Solka-Floc® powdered cellulose grade BW-300 FCC. BW-300 has an average particle size of 22 microns. This resulted in a grainy pop that had a "hard" bite. This pop was not successful.

Still later, other formulations were introduced which contained NutraSweet® brand of aspartame as their sweetener, such as Crystal Lightp ™ from General Foods Corporation and lite Popsicle® brand ice pop. These ice pop formulations did not use a dietary fiber, such as cellulose, which has no caloric content, and thus these formulations still contained a significant number of calories.

SUMMARY OF THE INVENTION

The present invention overcomes the problems and disadvantages of the prior art by providing a new low calorie frozen ice pop formulation.

The present invention also provides an ice pop formulation that is lower in calories than the present products on the market.

The present invention further provides an ice pop formulation of superior eating quality.

Additional advantages of this invention are set forth in part in the following description. Other advantages will be obvious from the following description or may become apparent by the practice of the invention. The appended claims particularly point out how the advantages of the invention can be obtained.

To achieve the advantages and in accordance with the purpose as embodied and broadly described herein, the invention provides ice pop formulation comprising:
(a) at least 1 percent by weight powdered cellulose having an average particle size of less than about 20 microns;
(b) a polyhydric alcohol in an amount sufficient to effectively lower the freezing point of said pop;
(c) a gum in an amount sufficient to keep the powdered cellulose suspended; and
(d) water.

In another preferred embodiment, the invention provides an ice pop formulation comprising:
(a) at least 1 percent by weight powdered cellulose having an average particle size of less than about 20 microns;
(b) a polyhydric alcohol in an amount sufficient to effectively lower the freezing point of said pop;
(c) an artificial sweetener;
(d) a gum in an amount sufficient to keep the powdered cellulose suspended;
(e) about 0 to about 0.5 percent by weight souring agent;
(f) flavoring ingredients and coloring; and
(g) the remaining being water.

DETAILED DESCRIPTION OF THE INVENTION

In accordance with the present invention, an ice pop formulation is provided which comprises at least 1 percent by weight powdered cellulose, where the powdered cellulose has an average particle size of less than about 20 microns.

Any cellulose product that has an average particle size of less than about 20 microns can be used. Average particle sizes larger than about 20 microns result in grainy ice pops. Solka Floc BW-400 FCC, manufactured by James River Corporation, Berlin, New Hampshire, which has an average particle size of 17.5 microns, is one preferable material that can be used.

The purpose of the cellulose is to prevent the formation of large ice crystals during freezing, and thereby provide a soft bite. Usage levels can range from about 1 percent by weight to any suitable level where the cellulose is still not detectable. With too high a percentage of cellulose, the presence of the cellulose in the ice pop becomes detectable and the pop becomes grainy, particularly with larger particle size material. With Solka Floc BW-400 FCC, about 1 to about 5 percent by weight is preferably used, with an optimum amount of about 3 percent.

The ice pop also contains a polyhydric alcohol in an amount sufficient to effectively lower the freezing point of said pop. This is also used to soften the bite of the pop. Any consumable polyhydric alcohol that will lower the freezing point can be used, such as sorbital, mannitol, glycerine and propylene glycol. Particularly preferred is glycerine.

Most of the caloric content of the present pop is provided by the polyhydric alcohol. While any effective amount of polyhydric alcohol can be used, a preferred amount, when glycerine is the polyhydric alcohol, is in the range from about 1 to about 5 percent by weight. At 1 percent, the pops are still somewhat hard to bite into. At 5 percent, the caloric content starts to become high. A particularly preferred range is between about 2 and about 3 percent by weight. At 2 percent, the caloric content of the pop is about 5.1 calories per 1.75 ounce serving.

A gum is also used according to a preferred embodiment of the present invention. The purpose of the gum is to keep the cellulose in suspension from the period of mixing through the freezing process. If left standing for a long period of time, cellulose will settle out of the mix.

Although one type of gum can be used, preferably a combination of gums is used. Any combination of gums can be used.

Any typical gum used in a food product can be used in this invention. Natural gums, such as xanthan, guar or locust bean can be used, as well as other water soluble gums including alginates, carrageenans, and cellulose gums.

Depending upon the type of gum used and the method of hydrating them, the level of gum used will vary. Generally, gum is used in an amount sufficient to keep the powdered cellulose suspended. In a preferred embodiment, the amount of gum will range from about 0.2 to about 0.6 percent by weight gum.

The ice pop can also contain an artificial sweetener. The amount of sweetner present depends upon the amount of sweetness desired. The preferred sweetener is aspartame. Generally, the amount of aspartame used can be varied between about 0.05 to about 0.2 percent by weight.

Flavoring, coloring and souring agents can also be added to the ice pop formulation as required. Any known flavoring agent can be used within the scope of the invention. The major criterion for a flavor is that it should be as concentrated as possible. The reason for this is that most flavors are carried in an alcohol solution, which adds calories to the ice pop. Some flavors can be used in concentrations exceeding 3 percent by weight, but at this level the contribution to the caloric content of the pop becomes significant.

Souring agents can also be added, depending upon the flavoring agent involved. Any souring agent can be used within the scope of the present invention. Citric acid is an example of a typical souring agent. Malic acid can also be used. The concentration of the souring agent depends again on the flavoring agent and taste to be achieved. Preferably about 0 to about 0.5 percent by weight souring agent is used.

A coloring agent can also be used, depending upon the color desired. As with flavoring agents, concentrated forms are preferred.

The remaining ingredient is water. According to the present invention, no special treatment of the water is necessary.

The following examples describe specific embodiments of the present invention and are not intended to limit the scope of the invention. The invention is only limited by the appended claims.

EXAMPLE 1

Lime Pops: The following example uses the basic formula for the pop, but it includes varying amounts of glycerine. The purpose is to determine the effects of the glycerine on the overall eating qualities of the pops.

| Ingredient | Formula A | B | C |
| --- | --- | --- | --- |
| BW-400 FCC | 3.0% | 3.0% | 3.0% |
| Xanthan Gum | 0.2 | 0.2 | 0.2 |
| Guar Gum | 0.2 | 0.2 | 0.2 |
| Citric Acid | 0.3 | 0.3 | 0.3 |
| Natural Lime Flavor | 0.15 | 0.15 | 0.15 |
| Green Color | 0.05 | 0.05 | 0.05 |
| Water | 95.0 | 94.0 | 93.0 |
| Glycerine | 1.0 | 2.0 | 3.0 |

The dry ingredients were weighed out and them mixed together. The dry mixing is important because it disperses the gum particles. This prevents clumping when they are added to the wet ingredients and allows for much easier dispersal. The wet ingredients were weighed out into a beaker, then while mixing with a counter rotating mixer, the dry ingredients were slowly added. Mixing was continued until a smooth blend was produced. The product was then sealed into small bags and frozen in a bath of dry ice and acetone. Freezing was done at about $-25$ to $-50$ degrees Fahrenheit. After freezing, the pops were allowed to condition overnight in the lab freezer at about 10 degrees Fahrenheit. The pops then were cut up for tasting. The contents of the pops were known only to one person. Everyone who tasted the pops picked the one with the 3.0% glycerine as the best. The 2.0% glycerine pop was deemed to be acceptable, while the 1.0% one was judged to be of poor quality. The caloric content of the formulas above are as follows: Formula A=3.1 calories/1.75 ounce serving, Formula B=5.1 calories/1.75 ounce serving, Formula C=7.1 calories/1.75 ounce serving.

EXAMPLE 2

Orange pops: This formula is for an orange flavored pop using three gums in the gum system. It also demonstrates the effects of adding the citric acid after mixing the other ingredients.

| Ingredient | Formula A |
| --- | --- |
| BW-400 | 3.0% |
| Aspartame | 0.1 |
| Xanthan Gum | 0.15 |
| Guar Gum | 0.15 |
| Locust Bean Gum | 0.1 |
| Citric Acid | 0.3 |
| Water | 93.0 |
| Glycerine | 3.0 |
| Orange Flavor | 0.15 |
| Color | 0.05 |

The dry ingredients were weighed out and dry blended, except for the citric acid which was kept separate. After weighing out the wet ingredients into a beaker, the gum, floc, and aspartame blend was slowly added to the wet ingredients while mixing with the counter rotating mixer. The blend became very viscous as the dry mix was added. It appeared that the omission of the citric acid during the initial mixing phase allowed the gums to hydrate more completely. When the citric acid was added to the mix, the gel was broken and the viscosity was reduced greatly. We did not have a viscometer to measure the exact amount of this effect. After final mixing, the mix was sealed and frozen as above. The calorie content of the above formula is about 7.1 calories/1.75 ounce serving.

EXAMPLE 3

Pina Colada: The following formula is for a pina colada and rum flavored pop.

| Ingredient | Formula A |
| --- | --- |
| BW-400 FCC | 3.0% |
| Xanthan Gum | 0.2 |
| Guar Gum | 0.2 |
| Citric Acid | 0.3 |
| Aspartame | 0.1 |
| Glycerine | 3.0 |
| Pina Colada Flavor | 0.2 |
| Rum Flavor | 0.2 |

| Ingredient | Formula A |
|---|---|
| Water | 92.8 |

As above, the dry ingredients were weighed out and then dry blended before mixing into the wet ones. The rest of the procedure was also the same. Caloric content of this formula is 8.1 calories/1.75 ounce serving. This is due to the higher levels of flavor.

EXAMPLE 4

Orange Flavor: This sample has a lower level of gums and citric acid than the others.

| Ingredient | Formula A |
|---|---|
| BW-400 FCC | 3.0% |
| Aspartame | 0.1 |
| Xanthan Gum | 0.1 |
| Locust Bean Gum | 0.1 |
| Guar Gum | 0.1 |
| Citric Acid | 0.2 |
| Glycerine | 3.0 |
| Orange Flavor | 0.2 |
| Color | 0.05 |
| Water | 93.15 |

The ingredients were blended as above, and then allowed to stand for a short period before freezing. A slight separation of the cellulose was noted. The mix had to be shaken before freezing. There was no separation during the freezing process.

These are a few examples of the possible combinations for making the ice pops. When a production run was made, it was done a little differently. Each of the dry ingredients were blended with water separately in a small mixing tank, then pumped into a larger tank where all the dry ingredients and water were mixed. The glycerine was weighed into this "base" mix. The base was then run through a pasteurization and homogenization step and stored overnight in a large cooling tank. This tank had agitation, so the material stayed suspended. The initial mixing of the dry ingredients appeared to be more efficient than our laboratory method, so a much more viscous blend was produced. The major contributor to the viscosity was the xanthan gum. From this experience we feel that the xanthan gum level could probably be cut in half.

The next day the base mix was pumped into the separate flavor tanks and the flavors and colors were added. This product was then fed into the ice pop machine. This machine usually produces 2,400 dozen pops per hour. However, for our product the machine had be slowed down due to the high viscosity. This is also another reason to probably use lower gum levels.

We claim:

1. An ice pop formulation comprising
   (a) at least 1 percent by weight powdered cellulose having an average particle size of less than about 20 microns;
   (b) a polyhydric alcohol in an amount sufficient to effectively lower the freezing point of said pop;
   (c) a gum in an amount sufficient to keep the powdered cellulose suspended; and
   (d) water.

2. The ice pop formulation according to claim 1 where said polyhydric alcohol is selected from the group consisting of glycerine and propylene glycol.

3. The ice pop formulation according to claim 1 where said polyhydric alcohol is glycerine.

4. The ice pop formulation according to claim 3 where said glycerine is present in an amount ranging from about 1 to about 5 percent by weight.

5. The ice pop formulation according to claim 4 where said glycerine is present in an amount ranging from about 2 to about 3 percent by weight.

6. The ice pop formulation according to claim 1 further comprising about 0.05 to about 0.2 percent by weight aspartame.

7. The ice pop formulation according to claim 1 where said powdered cellulose is present in an amount ranging from about 1 to about 5 percent by weight.

8. The ice pop formulation according to claim 1 where said powdered cellulose has an average particle size of less than about 17.5 microns.

9. The ice pop formulation according to claim 1 where said gum is at least one selected from the group consisting of xanthan, guar and locust bean.

10. The ice pop formulation according to claim 1 where said gum is present in an amount ranging from about 0.2 to about 0.6.

11. An ice pop formulation comprising
    (a) at least 1 percent by weight powdered cellulose having an average particle size of less than about 20 microns;
    (b) a polyhydric alcohol in an amount sufficient to effectively lower the freezing point of said pop;
    (c) an artificial sweetener;
    (d) a gum in an amount sufficient to keep the powdered cellulose suspended;
    (e) about 0 to about 0.5 percent by weight souring agent;
    (f) flavoring ingredients and coloring; and
    (g) the remaining being water.

12. The ice pop formulation according to claim 11 where said polyhydric alcohol is glycerine.

13. The ice pop formulation according to claim 12 where said glycerine is present in an amount ranging from about 1 to about 5 percent by weight.

14. The ice pop formulation according to claim 13 where said glycerine is present in an amount ranging from about 2 to about 3 percent by weight.

15. The ice pop formulation according to claim 11 where said powdered cellulose is present in an amount ranging from about 1 to about 5 percent by weight.

16. The ice pop formulation according to claim 11 where said powdered cellulose has an average particle size of less than about 17.5 microns.

17. The ice pop formulation according to claim 11 where said gum is at least one selected from the group consisting of xanthan, guar and locust bean.

18. The ice pop formulation according to claim 11 where said gum is present in an amount ranging from about 0.2 to about 0.6.

19. The ice pop formulation according to claim 11 where said souring agent is citric acid.

20. The ice pop formulation according to claim 11 where said artificial sweetener is aspartame which is present in an amount ranging from about 0.05 to about 0.2 percent by weight.

* * * * *